US010003575B2

(12) United States Patent
Shimomura

(10) Patent No.: US 10,003,575 B2
(45) Date of Patent: Jun. 19, 2018

(54) NETWORK MANAGEMENT SYSTEM

(71) Applicant: YOKOGAWA ELECTRIC CORPORATION, Musashino-shi, Tokyo (JP)

(72) Inventor: Takanori Shimomura, Musashino (JP)

(73) Assignee: YOKOGAWA ELECTRIC CORPORATION, Musashino-shi (JP)

( * ) Notice: Subject to any disclaimer, the term of this patent is extended or adjusted under 35 U.S.C. 154(b) by 0 days. days.

(21) Appl. No.: 14/129,215

(22) PCT Filed: Jun. 4, 2013

(86) PCT No.: PCT/JP2013/065419
§ 371 (c)(1),
(2) Date: Dec. 24, 2013

(87) PCT Pub. No.: WO2014/002699
PCT Pub. Date: Jan. 3, 2014

(65) Prior Publication Data
US 2015/0222599 A1    Aug. 6, 2015

(30) Foreign Application Priority Data

Jun. 25, 2012    (JP) .................................. 2012-142224

(51) Int. Cl.
*H04L 29/06*    (2006.01)
*H04L 12/46*    (2006.01)
(Continued)

(52) U.S. Cl.
CPC ...... *H04L 63/0263* (2013.01); *H04L 12/4625* (2013.01); *H04L 41/28* (2013.01);
(Continued)

(58) Field of Classification Search
CPC ...... H04L 63/20; H04L 41/28; H04L 63/0263
See application file for complete search history.

(56) References Cited

U.S. PATENT DOCUMENTS 7,197,660 B1 *   3/2007   Liu et al. ...................... 726/11
7,941,837 B1 *   5/2011   Jiang .................. H04L 63/0236
                                                 370/352
(Continued)

FOREIGN PATENT DOCUMENTS

GB          2485026 A  *  5/2012  ......... H04L 12/4641
JP         2011-142441 A     7/2011
(Continued)

OTHER PUBLICATIONS

International Search Report for PCT/JP2013/065419 dated Jul. 16, 2013 [PCT/ISA/210].
(Continued)

*Primary Examiner* — Meng Li
(74) *Attorney, Agent, or Firm* — Sughrue Mion, PLLC

(57) ABSTRACT

There is provided a network management system using wireless network management devices each having a plurality of security policies. With the network management system, the wireless network management devices can be concurrently used in networks with a plurality of security levels, and security can be ensured without installing firewalls externally, so that labor for setting and operating a network for redundancy can be saved. The network management system includes: a first network NW1 to which plant management devices 11 and 12 are connected; a second network NW2 to which field devices 51 to 5n are connected; and wireless network management devices 61 and 62 each having a firewall function and connected to the first network NW1 and the second network NW2.

9 Claims, 3 Drawing Sheets

(51) Int. Cl.
*H04W 12/02* (2009.01)
*H04L 12/24* (2006.01)
*H04W 88/16* (2009.01)

(52) U.S. Cl.
CPC ............. *H04L 63/20* (2013.01); *H04W 12/02* (2013.01); *H04W 88/16* (2013.01)

(56) References Cited

U.S. PATENT DOCUMENTS

| | | | |
|---|---|---|---|
| 2002/0188700 A1* | 12/2002 | Steitle | G06Q 10/06 709/220 |
| 2003/0065944 A1* | 4/2003 | Mao et al. | 713/201 |
| 2005/0240989 A1* | 10/2005 | Kim | H04L 63/0254 726/11 |
| 2007/0271605 A1* | 11/2007 | Le Pennec | H04L 41/042 726/13 |
| 2008/0320582 A1 | 12/2008 | Chen et al. | |
| 2011/0162060 A1* | 6/2011 | Vijayakumar | H04L 12/413 726/13 |
| 2011/0213900 A1* | 9/2011 | Nakamoto et al. | 710/8 |
| 2012/0005299 A1* | 1/2012 | Xu | H04L 29/12358 709/208 |
| 2012/0272308 A1* | 10/2012 | Mishina et al. | 726/11 |
| 2013/0094500 A1* | 4/2013 | Rotvold | H04L 63/0245 370/389 |

FOREIGN PATENT DOCUMENTS

| | | |
|---|---|---|
| JP | 2011-229041 A | 11/2011 |
| JP | 2012-34129 A | 2/2012 |
| WO | 2012/053135 A1 | 4/2012 |

OTHER PUBLICATIONS

Written Opinion for PCT/JP2013/065419 dated Jul. 16, 2013 [PCT/ISA/237].

Communication dated Jan. 19, 2016 issued by the European Patent Office in counterpart European Patent Application No. 13805217.0.

Hamed Okhravi, et al.; "Application of trusted network technology to industrial control networks"; International Journal of Critical Infrastructure Protection; XP026603486; vol. 2; No. 3; Oct. 1, 2009; pp. 84-94.

Hamed Okhravi & David M. Nicol, "Application of trusted network technology to industrial control networks", International Journal of Critical Infrastructure Protection 2, (2009), pp. 84-94.

* cited by examiner

NETWORK MANAGEMENT SYSTEM

TECHNICAL FIELD

The present invention relates to a network management system. In particular, the present invention relates to security management for networks.

BACKGROUND ART

FIG. 3 is a block diagram showing an example of background-art networks constructed based on a wireless communication standard ISA100.11a for industrial automation. Plant management devices 11 and 12 are connected to a first network NW1. These plant management devices 11 and 12 constitute a first security area SA1.

The first network NW1 is connected to a second network NW2 through a firewall 21.

Wireless network management devices 31 and 32 are devices each having a system manager function and a gateway function in ISA100.11a so that each of the wireless network management devices 31 and 32 can manage a wireless network and exchange information with any device on the wireless network.

In addition, the wireless network management devices 31 and 32 are not only connected to the second network NW2 but also connected to a third network NW3.

A maintenance terminal 4 is also connected to the third network NW3. These wireless network management devices 31 and 32 and the maintenance terminal 4 constitute a third security area SA3.

The third network NW3 is connected to a fourth network NW4 through a firewall 22.

Field devices 51 to 5n are connected to the fourth network NW4. These field devices 51 to 5n constitute a fifth security area SA5.

Here, the firewalls 21 and 22 are provided in network boundaries respectively in order to satisfy different security policies of the first security area SA1, the third security area SA3 and the fifth security area SA5.

Incidentally, for example, each security policy corresponds to information including IP address information for permitting connection to a corresponding network. When an IP address permitted for connection is set for a communication port, connection from another IP address through the communication port is not permitted.

A security policy for using the plant management devices 11 and 12 in a redundant configuration is set in the first security area SA1.

A security policy for using the wireless network management devices 31 and 32 in a redundant configuration is set in the third security area SA3.

A security policy for parallel driving the plurality of field devices 51 to 5n is set in the fifth security area SA5.

Patent Literature 1 discloses a technique about a control network management system in which a process control system in industrial automation is configured as a wireless control network system, so that falsification etc. by a malicious third party can be avoided and a process control wireless communication signal which is required to have a high real-time property with ensured priority and a signal which is not required to have such a high real-time property can be made to coexist on one and the same network.

CITATION LIST

Patent Literature

Patent Literature 1: JP-A-2011-142441

SUMMARY OF INVENTION

Technical Problem

When a wireless network management device is newly connected in the configuration of FIG. 3, network boundaries must be protected using a firewall, which results in the cost for installing the firewall.

In addition, since the maintenance terminal directly connected to the wireless network management devices and the security of the third security area SA3 for redundancy must be taken into consideration, security policy management becomes complicated.

In addition, not only installation of a firewall but also equipment such as a network switch for constituting a network for redundancy are required.

Further, depending on the configuration of each network, communication for controlling a redundancy configuration for the network may go through another network and affect it.

The present invention is directed toward the problems in the background art. An object of the invention is to use wireless network management devices each having a plurality of security policies so that the wireless network management devices can be concurrently used in networks with a plurality of security levels.

Another object is to use a wireless network management device having a built-in firewall function to thereby ensure security without externally installing a firewall and save labor for setting and operating a network for redundancy.

An objection of the present invention can be achieved with following configurations.

(1) A network management system comprising:
a first network to which a plant management device is connected;
a second network to which a field device is connected; and
network management devices each having a firewall function and connected to the first network and the second network.

(2) The system according to the above item (1), wherein the network management devices are connected to each other through a private communication line so as to be made redundant.

(3) The system according to the above items (1) or (2), wherein each of the network management devices has a plurality of communication ports for connecting to a plurality of networks.

(4) The system according to the above item (3), wherein respective security policies are assigned to a corresponding one of the communication ports, and each of the communication ports connects to a corresponding one of the networks each having a different security area.

(5) The system according to any one of the above items (1) to (4), wherein the network management system is constructed based on a wireless communication standard ISA100.11a for industrial automation.

Advantageous Effects of Invention

With these configurations, network management devices can be used concurrently in networks with a plurality of security levels.

In addition, it is possible to ensure security without separately providing firewalls so that it is possible to save labor for setting and operating a network for redundancy.

DESCRIPTION OF EMBODIMENTS

Figure 1:
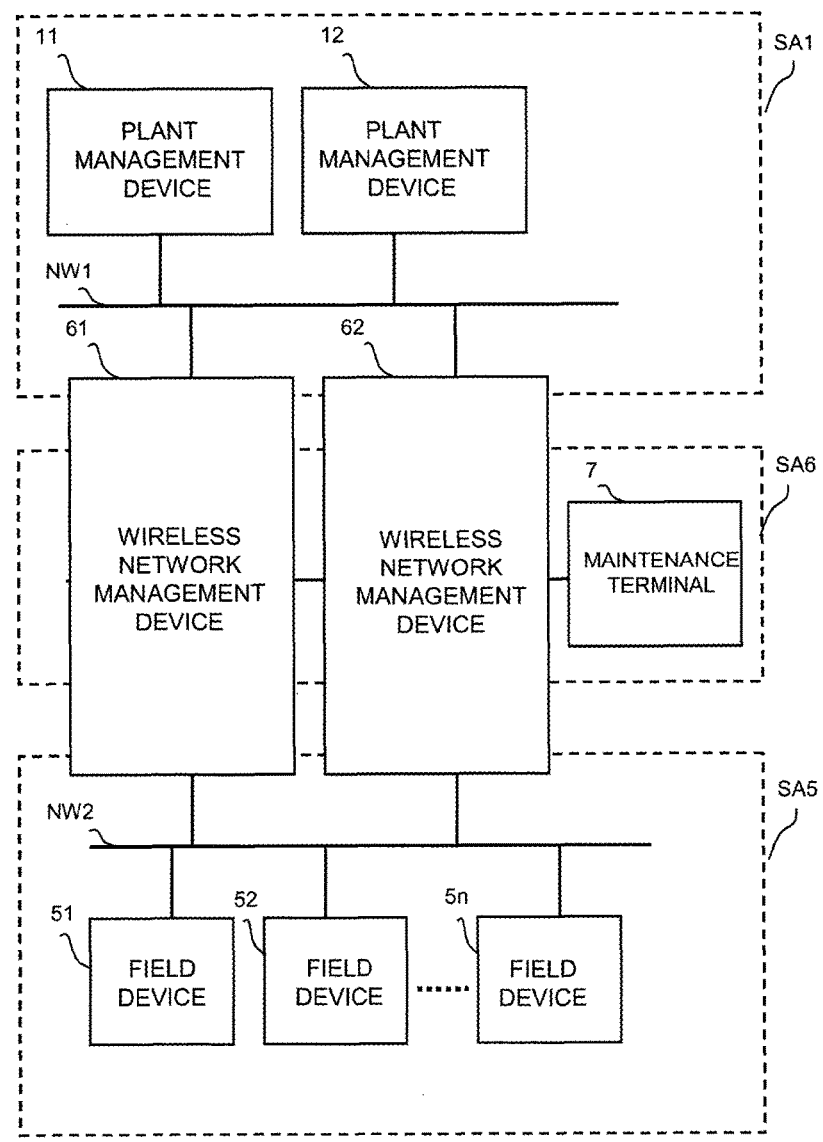
FIG. 1 is a block diagram showing an embodiment of the invention.
Figure 3:
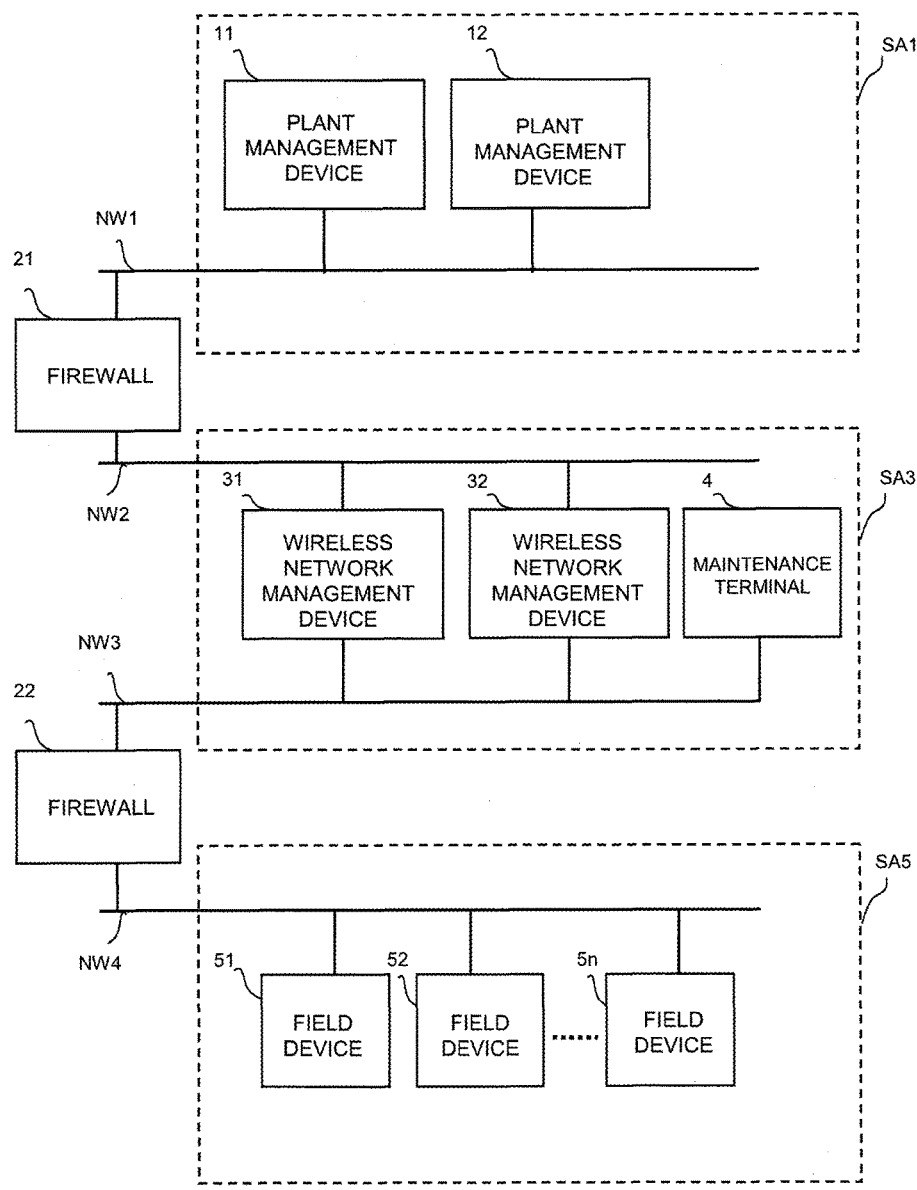
FIG. 3 is a block diagram showing an example of background-art networks.

The invention will be described below with reference to the drawings. FIG. 1 is a block diagram showing an embodiment of the invention. In FIG. 1, parts in common with those in FIG. 3 are referred to by the same numerals correspondingly.

Plant management devices 11 and 12 are connected to a first network NW1. These plant management devices 11 and 12 constitute a first security area SA1.

Wireless network management devices 61 and 62 are connected to the first network NW1 and a second network NW2. The wireless network management devices 61 and 62 are connected to each other through a private connection line. A maintenance terminal 7 is directly connected to the wireless network management device 61 or 62. These wireless network management devices 61 and 62 and the maintenance terminal 7 constitute a sixth security area SA6.

Field devices 51 to 5n are connected to the second network NW2.

Each of the wireless network management devices 61 and 62 has not only a system manager function and a gateway function in a wireless communication standard ISA100.11a for industrial automation but also a firewall function. Due to the firewall function provided in each of the wireless network management devices 61 and 62, the wireless network management devices 61, and 62 can be connected directly to the networks NW1 and NW2.

When security policies are assigned to respective ports of the wireless network management devices 61 and 62, the wireless network management device 61, 62 can be connected to a plurality of networks with different security policies.

In addition, a private connection line is used for communication between the wireless network management devices 61 and 62 so that a redundant configuration can be constructed.

Figure 2:
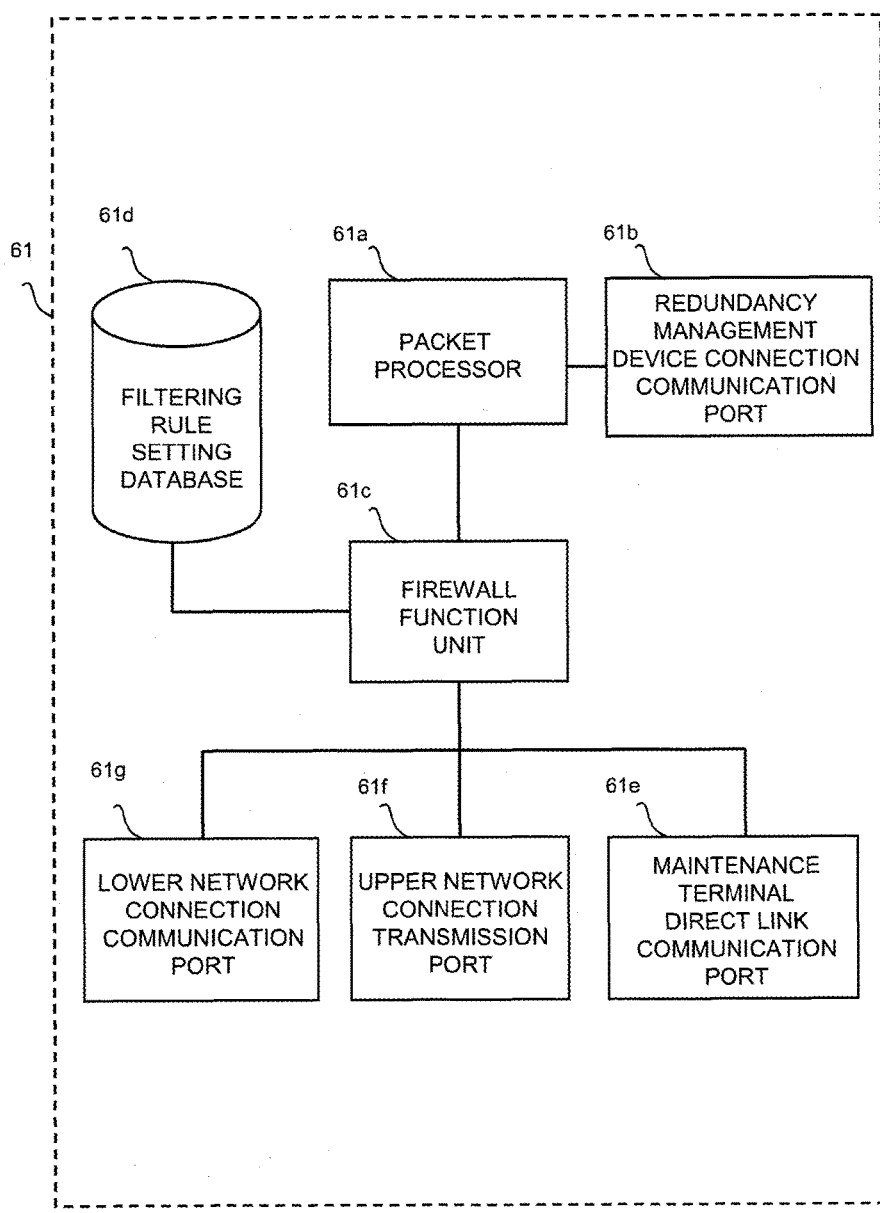
FIG. 2 is a block diagram showing a specific example of a wireless network management device 61.

FIG. 2 is a block diagram showing a specific example of the wireless network management device 61. In FIG. 2, a redundancy management device connection communication port 61b is connected to a packet processor 61a, and a firewall function unit 61c is also connected to the packet processor 61a.

A filtering rule setting database 61d is connected to the firewall function unit 61c. In addition, a maintenance terminal direct link communication port 61e, an upper network connection communication port 61f and a lower network connection communication port 61g are also connected to the firewall function unit 61c.

In the configuration of FIG. 2, the firewall function unit 61c acquires a filtering rule from the filtering rule setting database 61d and operates in accordance therewith. Here, the filtering rule means information such as a table of IP addresses which are permitted for communication through the respective communication ports.

The firewall function unit 61c controls received packets based on the filtering rule acquired from the filtering rule setting database 61d, and packets permitted for communication can be delivered to the packet processor 61a.

Information is synchronized between the wireless network management devices 61 and 62 which are configured redundantly so that the database in one wireless network management device 61 is equivalent to the database in the other wireless network management device 62.

For example, the redundancy management device connection communication port 61b for directly connecting one wireless network management device 62 to the other wireless network management device 61 is used for communication for synchronizing the databases. Thus, the communication for synchronizing the databases can be prevented from flowing out on the upper network NW1 and the lower network NW2.

According to such a configuration, each of the wireless network management devices 61 and 62 can be connected to the plurality of networks NW1 and NW2 having different security levels.

The wireless network management devices 61 and 62 can be installed in a security level boundary without separately using firewalls.

Since the wireless network management devices 61 and 62 are connected directly to each other through the private connection line, redundancy can be achieved easily without the necessity of constructing a network for a redundancy configuration.

Further, since communication required for operating the wireless network management devices 61 and 62 in the redundancy configuration is performed through the private connection line, the communication gives no influence to other networks. The private connection line in this case is not limited to a network cable. A private cable or a backplane of a printed wiring board may be used as the private connection line.

In addition, although the embodiment has been described in the case where the network management devices are wireless network management devices by way of example, the invention is not limited thereto. When the network management devices are wired network management devices, an equivalent effect can be also obtained.

As described above, according to the invention, the wireless network management devices each having a built-in firewall function are used. Thus, it is possible to achieve a network management system in which the wireless network management devices can be concurrently used in networks with a plurality of security levels, and security can be ensured without installing firewalls externally, so that labor for setting and operating a network for redundancy can be saved.

Incidentally, in the above description, explanation and illustration of the invention are simply to show a specific preferred embodiment. Accordingly, the invention is not limited to the embodiment but may further include lots of changes and modifications without departing from the nature of the invention.

The present application is based on Japanese patent application No. 2012-142224, filed on Jun. 25, 2012, the contents of which are incorporated herein by reference.

REFERENCE SIGNS LIST 11, 12 plant management device
51 to 5n field device 61, 62 wireless network management device
61a packet processor
61b redundancy management device connection communication port
61c firewall function unit
61d filtering rule setting database
61e maintenance terminal direct link communication port
61f upper network connection communication port
61g lower network connection communication port

The invention claimed is:

1. A network management system for industrial automation comprising:
a first network to which a plant management device is connected;
a second network to which a field device is connected, the first network and the second network having different security levels; and
a plurality network management devices each having a firewall function and each independently connected to the first network and the second network through the firewall function wherein each of the plurality of network management devices is configured to be concurrently used with the first network and second network having different security levels to provide a redundant network, the plurality of network management devices comprising a system manager function and a gateway function,
wherein the plurality of network management devices are directly connected to each other through a private communication line wherein the plurality of network management devices are configured to be redundant,
wherein a table of IP addresses, which are permitted for communication with the first and second networks, is synchronized through the private communication line between the plurality of network management devices, and
wherein the plurality of network management devices are uniquely identified on the first network,
wherein each of the plurality of network management devices configures the second network.

2. The system according to claim 1, wherein
each of the plurality of network management devices has a plurality of communication ports for connecting to a plurality of networks.

3. The system according to claim 2, wherein
respective security policies are assigned to a corresponding one of the communication ports, and each of the communication ports connects to a corresponding one of the networks each having a different security area.

4. The system according to claim 3, wherein the network management system is constructed based on a wireless communication standard ISA100.11a for industrial automation.

5. The system according to claim 1, wherein the plurality of network management devices each comprise a filtering rule setting database comprising the table of IP addresses for the firewall function.

6. The system according to claim 1, wherein the plurality of network management devices each comprise a dedicated redundancy connection communication port for directly connecting to each other for the private communication line.

7. The system according to claim 1, wherein the private communication line comprises a backplane of a printed wiring board.

8. The network management system according to claim 1, wherein each of the plurality of network management devices has a system manager function in ISA100.11a.

9. A network management system for industrial automation comprising:
a first network to which a plant management device is connected;
a second network to which a field device is connected, the first network and the second network having different security levels; and
a plurality of network management devices each having a gateway function and a firewall function and each independently connected to the first network and the second network through the firewall function wherein each of the plurality of network management devices is configured to be concurrently used with the first network and second network having different security levels to provide a redundant network,
wherein the plurality of network management devices are directly connected to each other through a private communication line wherein the plurality of network management devices are configured to be redundant, and
wherein a table of IP addresses, which are permitted for communication with the first and second networks, is synchronized through the private communication line between the plurality of network management devices,
wherein each of the plurality of network management devices configures the second network.

* * * * *